INVENTORS
Hermann Tietze
Gerhard Stampe

United States Patent Office 2,945,556
Patented July 19, 1960

2,945,556
FILTER MATERIAL SUPPORT

Hermann Tietze and Gerhard Stampe, Lubeck, Germany, assignors to Otto Heinrich Drager, Lubeck, Germany Original application Nov. 30, 1954, Ser. No. 472,082. Divided and this application Dec. 13, 1957, Ser. No. 707,074

4 Claims. (Cl. 183—49)

This invention relates to supports for filter material.

Filters must be constructed so that the loose granular filter material cannot escape through the lower filter opening, while at the same time the opening and filter material must be such as to offer the least resistance to the passage of air. Generally, screens, grates, and the like, are used for the support, a layer of relatively coarse material being first placed on the support, and then layers of successively smaller granules are placed in the filter until finally the filter material itself can be applied without falling through the lower layers.

An object of this invention is to produce a support which offers little resistance to the passage of air, and which can support the filter material without using layers of coarse material. Another object of the invention is to improve upon the means for collecting filtered air from out of the filter. In general, these objects are obtained by forming a grate-like filter support, the grate bars having flanges at an inclination greater than the natural slope angle of the filter material. Consequently, the filter material can rest directly on the grate without passing therethrough. Air ducts are connected into the space beneath the support or at the sides of the support for removing the filtered air.

The means by which the objects of the invention are obtained are disclosed more fully with reference to the accompanying drawings, in which.

Figure 1:
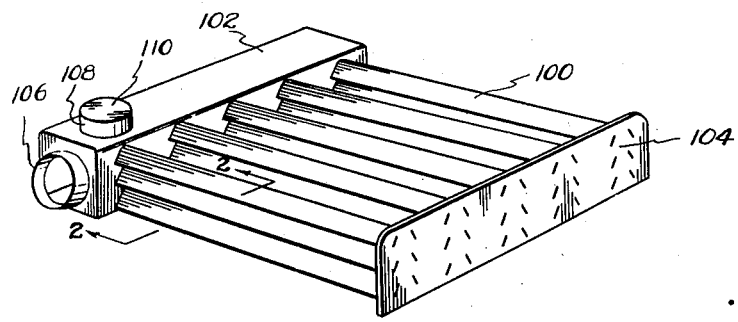
Figure 1 is a perspective view of a filter material support according to this invention.
Figure 2:
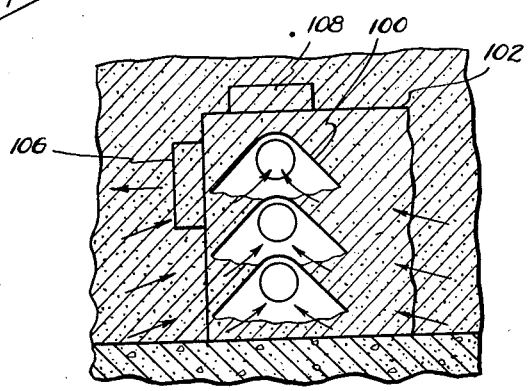
Figure 2 is a cross-sectional view taken on the line 2—2 of Figure 1.

In Figures 1 and 2 the filter support is composed of tiers of inverted U-shaped strips 100. The tiers of the supporting strips are, arranged parallel to each other. At one end they are connected to a collecting outlet duct 102, and at the other end they are attached to a supporting sheet 104. Filter material, which is poured or otherwise deposited on the tiers of supporting strips, is prevented from filling the space between the strips 100 because of the natural slope angle of the material with respect to the angles of the strips. Outlet duct 102 is provided with pipe fittings 106 and 108, either of which may be used. In the event that connection 106 is used, connection 108 is closed off by a cover 110. Air passes through the filter as indicated by the arrows in Figure 2.

Figure 3:
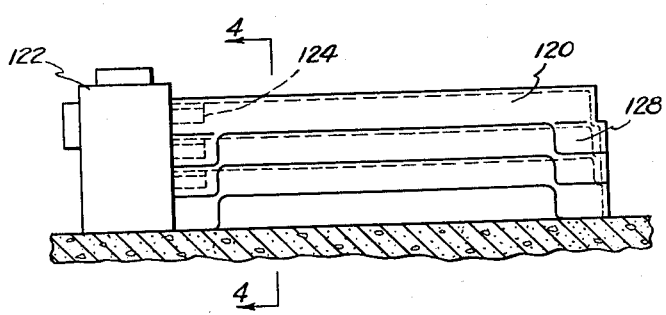
Figure 3 is a side view of a further form of a filter support.
Figure 4:
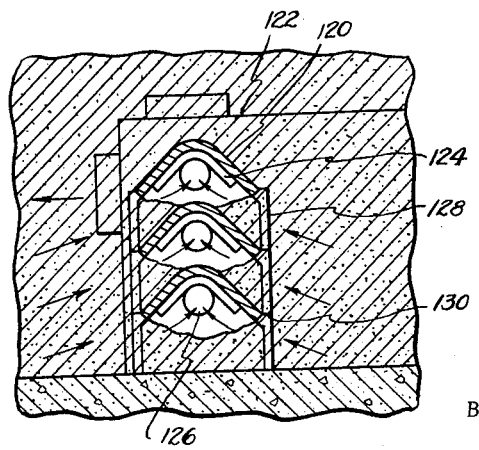
Figure 4 is a cross-sectional view on the line 4—4 of Figure 3.

In Figures 3 and 4 the filter support again consists principally of inverted V-shaped strips 120. Collecting duct 122 has a plurality of horizontally extending V-shaped flanges 124, one for each supporting strip, with openings into duct 122 beneath said flanges. At each end of each strip 120 are downwardly extending flanges 128 which serve as legs. At one end of the strips these legs rest over flanges 124. At the other end of the strips the legs are nested to hold the strips in superimposed spaced relation. This nesting is facilitated by the angle of the shoulder-like flanges 130 on each strip, upon which rests the leg 128 of the superimposed strip. The construction shown in Figures 1 to 4 permits the easy shipment of the filter support in a disassembled form from which it can be easily erected. The particular embodiment shown in Figures 3 and 4 has the added advantage that it is not affected by ground vibrations.

The supports of this invention may be constructed of sheet metal, but they may also be made of ceramic, clay, or burnt clay, or the like, to form partial resistance to corrosion which would be particularly suitable for sand filters used for air defense purposes..

This application is a division of the parent application Serial No. 472,082, filed Nov. 30, 1954, now abandoned.

Having now described the means by which the objects of the invention are obtained, we claim:

1. A filter material support comprising inverted V-shaped strips vertically spaced from each other to form open air passages between adjacent strips and arranged in tiers with a plurality of tiers assembled in parallel rows, an outlet air duct common to said tiers and having openings communicating with said air passages, connecting means for supporting one end of each of said strips on said duct, and leg means joined to the opposite ends of said strips.

2. A filter material support as in claim 1, said leg means comprising legs attached to each strip and resting upon a lower strip for separating the strips in each tier.

3. A filter material support as in claim 2, further comprising shoulder-like flanges on each strip forming a support for the leg of a superimposed strip.

4. A filter material support as in claim 1, said leg means comprising a supporting sheet common to each of said strips.

References Cited in the file of this patent

UNITED STATES PATENTS

| | | |
|---|---|---|
| 1,702,311 | Pantenburg | Feb. 19, 1929 |
| 1,858,329 | Hoersting | May 17, 1932 |
| 2,123,287 | Ney | July 12, 1938 |
| 2,493,356 | Mercier et al. | Jan. 3, 1950 |

FOREIGN PATENTS

| | | |
|---|---|---|
| 437,613 | France | of 1912 |
| 806,198 | France | Sept. 21, 1936 |
| 899,920 | France | Sept. 11, 1944 |
| 216,675 | Great Britain | June 5, 1924 |
| 409,942 | Germany | Feb. 14, 1925 |
| 864,309 | Germany | Jan 22, 1953 |